March 20, 1951  J. W. POSEY ET AL  2,545,629
FUSED ELECTRODE ASSEMBLY
Filed Aug. 26, 1949
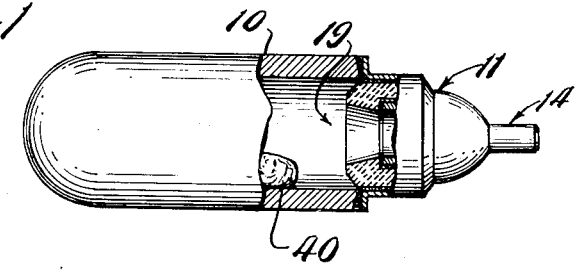
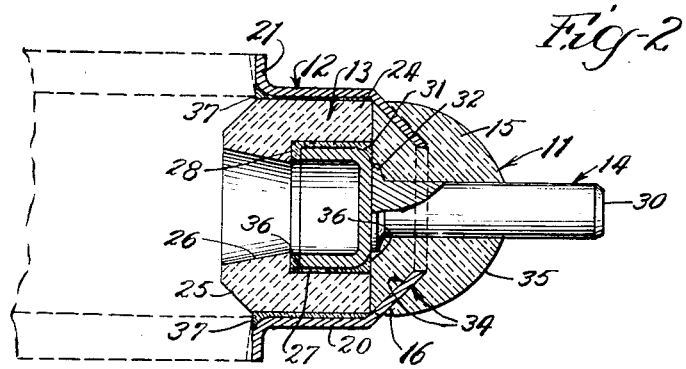
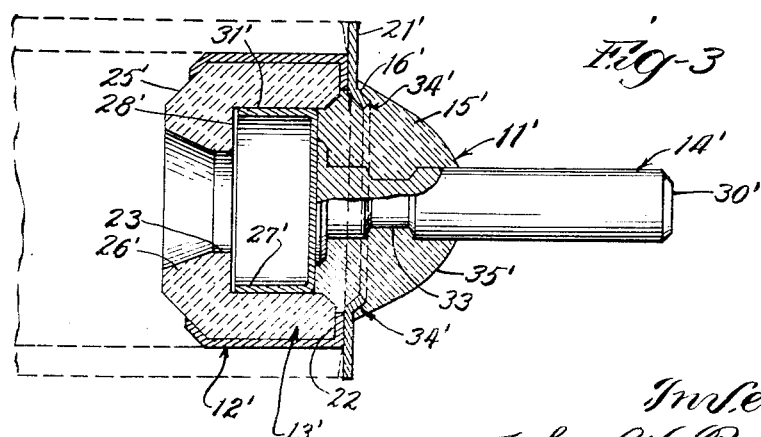
Inventors
John W. Posey &
Glen L. Weimer
By:- Brown, Jackson,
Boettcher & Dienner
Attys.

Patented Mar. 20, 1951

2,545,629

UNITED STATES PATENT OFFICE 2,545,629

FUSED ELECTRODE ASSEMBLY

John W. Posey and Glen L. Weimer, Elkhart, Ind., assignors to Durakool, Inc., Elkhart, Ind., a corporation of Indiana Application August 26, 1949, Serial No. 112,608

3 Claims. (Cl. 200—152)

Our present invention relates to improvements in electrode assemblies for mercury switches and the like.

In the past, mercury switches have been built utilizing various means of sealing the bottom electrode within an open end of a metal shell which may serve as a second electrode for the switch. The most popular method has employed a rubber seal surrounding the bottom electrode and squeezed under pressure in assembly to provide a tight seal against the escape of the mercury and gases, such as hydrogen from the interior of the switch. Such a seal does not prove entirely satisfactory, however, as it is not gas tight and is subject to creepage during operation of the mercury switch. Recently, fused glass has been utilized to seal the bottom electrode in an electrode unit insertable in the open end of the shell casing, the open end of which is normally rolled over to hold the electrode unit therein in assembly. Still more recently one of the applicants herein, Glen L. Weimer, disclosed a new and useful mercury switch construction in his application No. 3,704, entitled "Mercury Switches and Relays," filed on January 22, 1948, in conjunction with co-inventor Herbert E. Bucklen, III. A fused head construction of a ceramic insulator holding the electrode post and sealed therewith by molten glass was displayed in that application. A metal sleeve surrounding the ceramic was fused with the glass and then welded to the outer shell of the switch. Such a construction provided an adequate seal and successfully overcame the sealing difficulties mentioned above. However, we have made certain improvements over the construction shown in the above mentioned application in an effort to overcome certain disadvantages thereof and to provide a tighter and more efficient seal and greater rigidity to the assembled switch. Since we contemplate the use of the same or similar materials in our various switch parts, reference herein is made to the above application Serial No. 3,704 of Bucklen and Weimer.

It is an object of our invention to provide a new mercury switch or relay, preferably of the type constructed with an outer metal shell forming one electrode and a novel electrode assembly insertable in an open end of the outer shell, such assembly including a second electrode for the switch or relay.

A further object of our invention is to provide an electrode assembly capable of insertion in an outer metal shell as a complete unit and including an electrode inserted in a ceramic insulator member, which in turn is carried by an annular metal sleeve with a fused glass insulating seal formed between the electrode and ceramic and between the ceramic and metal sleeve to form a unitary fused head assembly for a mercury switch or the like that is both rigid and gas tight.

Another object of our invention is to provide an electrode assembly of the aforementioned type in which the metal sleeve surrounding the ceramic insulator includes a flanged eyelet portion embedded in a glass bead surrounding the electrode shank to provide an improved platform seal to prevent escape of gas or mercury from the interior of the mercury switch and to give greater operating ruggedness to the assembled switch or relay.

A further object of our invention is to provide a metal sleeve in the electrode assembly, as aforesaid, capable of holding a ceramic insulator in such a manner therein as to support it against shock and jarring during active operation of the mercury switch or relay.

A still further object of our invention is to provide an electrode head assembly, as described above, having the various parts thereof of like coefficient of thermal expansion to prevent their breaking away from one another under operating temperatures of the mercury switch or relay.

These and other objects will appear from time to time as the following specifications and description proceed. Now in order to acquaint those skilled in the art with the manner of constructing and utilizing mercury switches and relays embodying the principles of our invention, we shall describe, in connection with the accompanying drawings, certain preferred embodiments of our invention.

In the drawings:

Figure 1 is a longitudinal sectional view of a mercury to mercury type switch constructed in accordance with our invention;

Figure 2 is a detailed front elevation of the fused electrode assembly showing the manner of assembly and arrangement of the various parts and manner of sealing them together in a single unitary head; and Figure 3 is a detailed front elevation of an alternate head assembly similar to that shown in Figures 1 and 2.

Referring now to Figure 1, the switch therein shown is of the mercury to mercury contact type and comprises a tubular metal outer shell 10 in which an electrode assembly, generally indicated at 11, is insertable. The electrode assembly, as indicated in detail in Figure 2, comprises generally an annular metal sleeve 12, a tubular ceramic insulator 13 insertable in said sleeve, an electrode 14 adapted to fit within one end of the ceramic insulator, and a fused glass seal 15 surrounding the electrode and adapted to grip an eyelet portion 16 of the metal sleeve 12 to firmly hold the ceramic to the sleeve and the electrode to the ceramic.

As shown in Figure 1, the outer shell comprises a hollow metal cylinder closed at one end and provided with an open end 19 adapted to receive an electrode assembly, such as is shown in Figures 2 and 3. The outer shell may comprise one electrode of the mercury switch and is designed to be connected in operating electric circuit by suitable means known to those familiar with the art. The outer shell is preferably made of nickel or nickel-coated steel, as will more clearly appear in the operational description hereinafter.

The electrode assembly 11 shown in Figure 2 displays a preferred embodiment of our invention. As seen in that figure, an annular metal sleeve 12 has a central cylindrical portion 20, set inwardly at one end thereof to form the annular eyelet portion 16 shaped as a frustrum of a cone. An annular flange portion 21 may be provided at the opposite end of the cylinder portion 20 from the eyelet and is adapted to be welded to the lower end of the outer metal shell 10 to seal over the open end 19 thereof. The sleeve may be of any suitable metal, such as steel, adaptable to be properly welded to the outer metal shell, and preferably having the same thermal expansive characteristics as the glass bead, ceramic and electrode 14.

The ceramic insulator 13 may be made of any suitable ceramic and, as shown herein, is preferably of a dense steatite material, chief of which is clinoenstatite crystals (MgO-SiO$_2$). As shown in Figure 2, the ceramic is in the form of a cylindrical shell 24 of a slightly smaller outside diameter than the inside diameter of the annular metal sleeve 12, so that it may be inserted therein in final assembly. One end of the ceramic insulator is provided with an angular chamfer 25 formed along the outer annular edge thereof. A frustro-conical bore 26 is provided inwardly of the chamfered angular edge of the ceramic insulator, to meet a cylindrical bore 27 extending from the opposite end of the ceramic. Both the conical bore 26 and the cylindrical bore 27 are disposed centrally of the ceramic insulator so as to provide a hollow center portion therefor. An annular shoulder portion 28 may be provided at the bottom of the cylindrical bore 27 where it meets the conical bore 26 for supporting the lower end of the electrode 14 insertable in the cylindrical bore.

As shown in Figure 2, the electrode 14 may be composed of an upper solid shank portion 30 and a lower cup portion 31 operatively welded together so as to make a unitary structure throughout. As herein shown, the electrode structure is preferably made of nickel or nickel-coated steel, but may be of any other suitable electric conductor material. In assembly, the cup portion 31 is adapted to fit within the cylindrical bore 27 of the ceramic so that the hollow center cup portion thereof is in open receiving relation with the beveled shaped conical bore 26 whereby mercury may readily reach the electrode 14. The shank end 30 of the electrode 14 is shown as a cylindrical rod having a flanged end 32 adapted to be welded securely to the bottom of the cup portion 31. Such a bi-electrode construction is not essential however and a single-piece electrode may be used with equal facility.

In combining the outer sleeve, the ceramic and the electrode to form a unitary electrode assembly, the ceramic is placed with its conical bore downward and the outer metal sleeve slipped over the ceramic so that the inner edge of the eyelet portion 16 rests along the upper edge of the ceramic in a central disposition therewith. The bottom cup portion 31 of the electrode is then inserted into the cylindrical bore 27 of the ceramic with the shank portion 30 extending upwardly in a central disposition therewith. A sealing bead of fused glass 35 of a common borosilica type having a fusing temperature of around 1800° F. may then be introduced to surround the shank of the electrode to fill in a void 36 between the outer diameter of the hollow lower cup of the electrode and the cylindrical bore 27 of the ceramic to thereby secure the electrode and the ceramic together in unitary relation. It will be noted that the eyelet portion of the outer shell extends inwardly toward the electrode shank and the fused glass is united on both sides therewith to form a platform type of seal 34 giving strength and rigidity to the assembled unit. The glass is allowed to cool in the form of a bead 35 around the shank of the electrode. It is also desirable that the liquid glass join the ceramic cylindrical side walls to the inner side walls of the metal sleeve 12. To insure such fusion, it may be necessary to turn the electrode assembly over to pour the glass in from the end of the sleeve bearing the flange 21. It will be seen that fused glass fills in the void, indicated generally at 36 of Figure 2, and also fuses the ceramic to the outer metal sleeve by filling the void, indicated generally at 37 of Figure 2. Thus assembled, an electrode unit is provided having a metal to glass to ceramic to glass to metal sealing structure. It should also be noted that by providing a platform seal by means of the eyelet embedded in the glass bead a new and useful manner of supporting the ceramic against shock and jarring when the mercury switch is being operated has been provided which will give the rigidity and ruggedness heretofore unpresent in switches of this type.

Referring now to Figure 3, an alternate electrode assembly 11', similar to that of Figure 2, is shown; it will be noted that the cylindrical metal 12' in that figure is provided with an inwardly bent annular flange 22 adapted to contact the upper portion of the ceramic 13'. An eyelet 16' is formed integrally with a flange portion 21' in a single annular plate welded to the upper flange 22 of the sleeve. The ceramic 13' differs from the ceramic 13 of Figure 2 in that an intermediate cylindrical bore 23 is disposed between a frustro-conical bore 26' disposed at one end of the ceramic and a cylindrical bore 27' disposed at the opposite end of the ceramic. A shoulder 28' similar to shoulder 28, shown in Figure 2, is provided at the bottom of the cylindrical bore 27' to support a cup portion 31' of electrode 14' similar to the cup 31, shown in Figure 2. The upper end of the electrode 14' is provided with a cylindrical rod portion 30' similar to rod 30, shown in Figure 2, but having undercut detents 33 intermediate its ends provided for the purpose of allowing more secure gripping of the electrode shank by the fused glass bead 35' in assembly. In assembling a unit such as is shown in Figure 3 several noticeable differences over the construction of Figure 2 will be apparent. After insertion of the ceramic in the metal sleeve 12' the lower edge of the sleeve is rolled over to meet the chamfered edge 25' of the ceramic to thereby hold the two together in assembly. It will also be noted that the fused glass does not fill the voids between the ceramic and the outer metal sleeve or between the ceramic and the cup portion 31' of the electrode, the construction here being such that these various parts assemble in close receiving relation with one another. However, the detents provided in the electrode shank are gripped firmly by the fused glass bead to provide rigidity against longitudinal jarring of the assembled unit. A platform seal 34' is provided by imbedding the eyelet 16', similar to 16 of Figure 2, in the fused glass bead to perform a similar function as that described in connection with Figure 2. It should also be noted that this alternate assembly provides an electrode unit having compactness and rigidity and sealed against gas leakage from the interior of the completed mercury switch.

*Assembly, use and operation*

Either electrode assembly described herein may be operatively joined to the outer shell 10, as by welding, in a manner similar to that disclosed in the Bucklen and Weimer application Serial No. 3,704 of reference herein, whereby the outer shell containing the actuating mercury body 40 is inserted between the pair of welding electrodes in a gas tight chamber, the air or gas being evacuated from the outer shell, the electrode assembly unit being inserted in proper position with the outer shell so that flange members of the metal sleeve are in contact with the bottom portion of the outer metal shell and the unit thus welded together along the flange portion of the sleeve and the bottom of the metal shell in an evacuated atmosphere. If desired, gas, such as hydrogen, may be introduced in the shell before the welding operation to provide a gas-filled mercury switch. In providing an electrode assembly fused to the outer sleeve by means of the fused glass bead, such as has been described herein, wherein the glass fuses with both the ceramic and the metal parts to operatively hold them in rigid assembly, it has been found desirable to construct the metal parts coming in contact with the mercury body of nickel-plated steel or of nickel metal entirely having like thermal expansion characteristics. The desirable features obtained by constructing the metal surfaces of such material are such that the operating temperatures of the mercury switch are greatly reduced below those constructed with other classes of materials. Such a reduction in temperature rise in a switch results in the switch being able to carry a greater load without damage thereto. In addition to the striking advantages of reduced operating temperatures, the nickel coating or nickel parts substantially eliminate all contamination of the mercury, and further reduces the chance of burning through of the mercury in the case of nickel-coated parts to the steel of the shell and the electrode mounted therein. Moreover, insurance against rusting of the various metal parts is provided by such a nickel-coating or nickel metal construction.

To provide such a nickel-coating on the various metal parts coming in contact with the mercury, the electrode assembly and outer metal casings are preferably washed in a suitable known nickel-plating bath, such as a solution of various known compositions and combinations of nickel chloride, nickel cyanide or nickel ammonium sulphate. It is obvious that the use of nickel coated steel or solid nickel may be more desirable and more convenient and will not depart from the spirit of this construction. After the various parts have been nickel coated, as described above, they may be brushed by means of stainless steel brushes before the electrode is assembled in the outer shell. The preferable construction of the switch, as described herein, is to have these metal parts made of nickel or nickel coated steel. The ceramic insulator, as mentioned before, is preferably of dense steatite material and the glass seals are preferably of common boro-silica type glass, all of which parts when assembled as an electrode unit will have common or substantially matching thermal expansion characteristics over the operating temperature range to which the switch may be subjected in normal operation, so that the electrode assemblies, when bonded together in the manner described, will not have breaking away of the various parts from one another. It is, of course, understood that other materials than those specified above may be used, if desired.

In operating a mercury switch of the type described above, the mercury is normally at the closed end of the outer shell when the switch is open, so that there is no mercury to mercury contact across the outer shell electrode and the electrode in the electrode assembly. To close the mercury switch, the entire unit is merely tipped over so that the mercury contacts the inner surface of the outer metal shell and the cup portion of the lower electrode, thus allowing electric current to flow between the two electrodes in a manner well known to those familiar with the art of mercury switches. It should be further noted that in providing an electrode assembly having an eyelet 16 or 16', as shown in Figures 2 or 3, respectively, means have been provided for supporting the ceramic insulator against shock and jarring when the switch is tipped over in operation, thus providing a further guarantee against the various parts of the assembled unit breaking away from one another.

While we have herein shown what we consider to be preferred embodiments of our invention, it will be readily understood that numerous changes and modifications and the use of equivalents may be used without departing from the spirit and scope of this invention, and, therefore, we do not wish to be limited to the specific embodiment herein illustrated, except as may appear in the following appended claims.

We claim as our invention:

1. In an electrode assembly for mercury switches or relays of the type adapted to be inserted as a unit in the open end of a tubular metal shell adapted to carry a body of mercury, an outer metal sleeve, an annular flange connected with said sleeve and adapted to be welded to the abutting open end of said shell, an annular frustro-conical eyelet connected to said sleeve and projecting from said sleeve in an opposite sense to said flange, a cylindrical ceramic insulator insertable within said sleeve, an electrode insertable in said ceramic having a cup portion adapted to mate with a cylindrical opening centrally disposed at one end of said ceramic and a solid shank portion rigidly attached to said cup portion and extending axially therefrom;

and a sealing glass bead adapted to seal and bond said sleeve to said ceramic, said ceramic to said electrode, and said eyelet to said ceramic and electrode whereby a rigid, rugged and gas tight electrode assembly is provided.

2. In an electrode assembly for mercury switches of the type adapted to be inserted in the open end of a tubular metal shell, an outer metal sleeve, a ceramic insulator having a mercury receiving frustro-conical bore at one end and a cylindrical bore at the opposite end, both bores being centrally disposed of said ceramic; a metal electrode having a cup portion at one end thereof adapted to be inserted in said cylindrical bore of said ceramic, an annular eyelet extending angularly from said sleeve and adapted to partially overlie said electrode cup assembled in said ceramic, a flanged skirt at the opposite end of said sleeve adapted to be welded in abutting relation with the open end of said shell, and a fused glass bead forming a metal to glass to ceramic to glass to metal gas tight seal between said sleeve, ceramic and electrode, said glass also surrounding three surfaces of said annular eyelet and bonding therewith to provide a gas tight platform seal which furnishes shock resistance and gas tightness to said electrode assembly.

3. In a unitary electrode assembly for mercury switches or relays of the type adapted to be inserted in the open end of a tubular mercury carrying metal shell, an outer metal sleeve, a combined flange and annular eyelet member being fastened to one end of said sleeve, said flange being adapted to abut and weld with the open end of said shell, a ceramic insulator adapted to be inserted within said sleeve, said ceramic having a centrally disposed cylindrical bore at one end thereof and a frustro-conical bore at its opposite end, said two bores being interconnected by a smaller intermediate cylindrical bore, and said ceramic being firmly gripped in assembly by a rolled over edge of said sleeve along a chamfered peripheral edge of said ceramic; an electrode including a hollow cup portion adapted to be inserted in said first mentioned cylindrical bore of said ceramic insulator and a solid metal shank extending outwardly from the closed bottom of said cup portion and rigidly secured thereto; detents in said electrode shank, and a fused glass bonding seal surrounding said electrode shank and said eyelet, filling said detents and fusing with said ceramic to thereby provide a rigid and gas tight electrode assembly.

JOHN W. POSEY.
GLEN L. WEIMER.

REFERENCES CITED

The following references are of record in the file of this patent:

UNITED STATES PATENTS

| Number | Name | Date |
|---|---|---|
| 2,056,035 | Beggs | Sept. 29, 1936 |
| 2,132,920 | Bear | Oct. 11, 1938 |